(12) United States Patent
Haraguchi et al.

(10) Patent No.: US 11,145,942 B2
(45) Date of Patent: Oct. 12, 2021

(54) CYLINDRICAL BATTERY

(71) Applicant: SANYO Electric Co., Ltd., Daito (JP)

(72) Inventors: Shin Haraguchi, Hyogo (JP); Kyosuke Miyata, Osaka (JP); Tomohiko Yokoyama, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 378 days.

(21) Appl. No.: 16/086,121

(22) PCT Filed: Mar. 14, 2017

(86) PCT No.: PCT/JP2017/010121
§ 371 (c)(1),
(2) Date: Sep. 18, 2018

(87) PCT Pub. No.: WO2017/163999
PCT Pub. Date: Sep. 28, 2017

(65) Prior Publication Data
US 2020/0313151 A1   Oct. 1, 2020

(30) Foreign Application Priority Data

Mar. 25, 2016  (JP) .............................. JP2016-061017

(51) Int. Cl.
*H01M 50/578*  (2021.01)
*H01M 50/10*  (2021.01)
(Continued)

(52) U.S. Cl.
CPC ......... *H01M 50/578* (2021.01); *H01M 50/10* (2021.01); *H01M 50/107* (2021.01);
(Continued)

(58) Field of Classification Search
CPC ...... H01M 2/022; H01M 2/0408; H01M 2/26; H01M 2/30; H01M 2/345; H01M 2200/20;
(Continued)

(56) References Cited

U.S. PATENT DOCUMENTS 5,998,051 A * 12/1999 Poirier ................. H01H 37/043
429/7
6,242,126 B1   6/2001 Mori et al.
(Continued)

FOREIGN PATENT DOCUMENTS

| CN | 1200199 A | 11/1998 |
|---|---|---|
| CN | 205069727 U | 3/2016 |

(Continued)

OTHER PUBLICATIONS

English translation of Office Action dated Nov. 26, 2020, issued in counterpart CN Application No. 201780018339.6 (4 pages).
(Continued)

*Primary Examiner* — Maria Laios
*Assistant Examiner* — Adam J Francis
(74) *Attorney, Agent, or Firm* — Westerman, Hattori, Daniels & Adrian, LLP

(57) ABSTRACT

A cylindrical battery according to an embodiment of the present invention includes an electrode body, an electrolyte solution, a tubular exterior can that accommodates the electrode body and the electrolyte solution, and a sealing body that is crimped on an opening portion of the exterior can. The sealing body includes a current interrupt mechanism in which a valve member and a metal plate are joined to each other with an insulating plate that includes a circular hollow portion interposed therebetween. The metal plate includes a thin portion that has a circular shape or a C-shape. The hollow portion and the thin portion are concentric with
(Continued)

each other when viewed from a direction perpendicular to the metal plate. D1/D2 is no less than 0.56 and no more than 1 where D1 is the diameter of the thin portion, and D2 is the diameter of the hollow portion.

4 Claims, 2 Drawing Sheets

(51) Int. Cl.
  *H01M 50/107* (2021.01)
  *H01M 50/147* (2021.01)
  *H01M 50/166* (2021.01)
  *H01M 50/531* (2021.01)
  *H01M 50/543* (2021.01)

(52) U.S. Cl.
  CPC ....... *H01M 50/147* (2021.01); *H01M 50/166* (2021.01); *H01M 50/531* (2021.01); *H01M 50/543* (2021.01); *H01M 2200/20* (2013.01)

(58) Field of Classification Search
  CPC ............ H01M 50/578; H01M 50/147; H01M 50/531; H01M 50/3425; H01M 50/367; H01M 50/593
  See application file for complete search history.

(56) References Cited

U.S. PATENT DOCUMENTS

| | | | |
|---|---|---|---|
| 6,376,120 | B1 | 4/2002 | Azema |
| 2012/0114979 | A1 | 5/2012 | Kim et al. |
| 2013/0196186 | A1* | 8/2013 | Yokoyama .......... H01M 50/538 429/53 |
| 2013/0196191 | A1 | 8/2013 | Arai et al. |
| 2014/0038005 | A1 | 2/2014 | Yamato et al. |
| 2015/0287965 | A1 | 10/2015 | Kim et al. |

FOREIGN PATENT DOCUMENTS

| | | |
|---|---|---|
| JP | 8-306351 A | 11/1996 |
| JP | 2000-3702 A | 1/2000 |
| JP | 2009-110808 A | 5/2009 |
| JP | 2013-502035 A | 1/2013 |
| JP | 2013-157157 A | 8/2013 |
| JP | 2013-171817 A | 9/2013 |
| JP | 2015-144095 A | 8/2015 |
| WO | 2012/147782 A1 | 11/2012 |

OTHER PUBLICATIONS

International Search Report dated Jun. 13, 2017, issued in counterpart application No. PCT/JP2017/010121. (2 pages).

* cited by examiner

CYLINDRICAL BATTERY

TECHNICAL FIELD

The present invention relates to a cylindrical battery that includes a current interrupt mechanism.

BACKGROUND ART

Sealed batteries are broadly classified into cylindrical batteries, prismatic batteries, and pouch batteries by the shape and material of exterior bodies that accommodate electrode bodies, which are power generation components. Among these batteries, the cylindrical batteries are widely used as power sources for driving, for example, electric tools, electrically assisted bicycles, and electric vehicles. The cylindrical batteries for these applications are used as assembled batteries that are connected in series or in parallel.

In a sealing body of a cylindrical battery, a measure to ensure safety is taken. In a sealing body of each of cylindrical batteries disclosed in PTL 1 and PTL 2, a current interrupt mechanism that operates when the pressure in the battery increases and reaches a certain value is incorporated.

FIG. 5 is a sectional view of the sealing body disclosed in PTL 1. The current interrupt mechanism that is incorporated in the sealing body is formed by stacking an outer aluminum foil 51, an inner aluminum foil 52, and an insulating plate 53 that is interposed therebetween. The insulating plate 53 includes a hollow portion in a central portion, and the outer aluminum foil 51 and the inner aluminum foil 52 are joined to each other in the hollow portion of the insulating plate 53. When the pressure in the battery increases, the pressure is applied to the outer aluminum foil 51. The inner aluminum foil 52 includes an annular thin portion 52a that is formed around a weld between the inner aluminum foil 52 and the outer aluminum foil 51. When the pressure in the battery reaches a certain value, the thin portion 52a breaks, and a current path between the outer and inner aluminum foils 51 and 52 is interrupted. When the pressure in the battery further increases, the outer aluminum foil 51 breaks, and gas in the battery is discharged. The outer aluminum foil 51 functions as a safety valve in this way.

The current interrupt mechanism in PTL 2 includes an aluminum plate that includes a thin portion serving as an easily broken member and that is welded to a safety valve as with PTL 1. The aluminum plate functions as a terminal plate and is directly connected to an electrode plate lead that extends from an electrode body.

CITATION LIST

Patent Literature

PTL 1: Japanese Published Unexamined Patent Application No. 8-306351
PTL 2: Japanese Published Unexamined Patent Application No. 2009-110808

SUMMARY OF INVENTION

Technical Problem

In each of the current interrupt mechanisms disclosed in PTL 1 and PTL 2, a weld between two metal plates is not broken but the thin portion of one of the metal plates is broken to interrupt the current path in the battery. The current interrupt mechanism that operates when the thin portion of the metal plate breaks has an advantage of easy adjustment of an operating pressure. However, the operating pressure of the current interrupt mechanism varies to a certain extent. In consideration of the variation, it is necessary for the design value of the operating pressure to be determined to be rather low. A reduction in the variation of the operating pressure enables the design value of the operating pressure to be determined to be rather high. This increases the mechanical strength of the terminal plate and improves the yield of the battery in a manufacturing process. In addition, a reduction in the variation of the operating pressure leads to reliable operation of the current interrupt mechanism. This enables the safety of the cylindrical battery to be improved.

The present invention has been accomplished in view of the above description, and it is an object of the present invention to provide a cylindrical battery that includes a current interrupt mechanism in which the variation in the operating pressure is reduced.

Solution to Problem

To solve the above problem, a cylindrical battery according to an embodiment of the present invention includes an electrode body, an electrolyte solution, a tubular exterior can that has a bottom and that accommodates the electrode body and the electrolyte solution, and a sealing body that is crimped on an opening portion of the exterior can. The sealing body includes a current interrupt mechanism in which a valve member and a metal plate are joined to each other with an insulating plate that includes a circular hollow portion interposed therebetween. The metal plate includes a thin portion that has a circular shape or a C-shape. The hollow portion and the thin portion are concentric with each other when viewed from a direction perpendicular to the metal plate. $D1/D2$ is no less than 0.56 and no more than 1 where $D1$ is a diameter of the thin portion, and $D2$ is a diameter of the hollow portion.

Advantageous Effects of Invention

According to an embodiment of the present invention, a cylindrical battery that includes a current interrupt mechanism in which the variation in the operating pressure is reduced can be provided.

DESCRIPTION OF EMBODIMENTS

A non-aqueous electrolyte secondary battery is taken as an example to describe a cylindrical battery according to an embodiment for carrying out the present invention. The present invention is not limited to the embodiment described below, and can be appropriately changed without departing from the spirit of the present invention and carried out.

Figure 1:
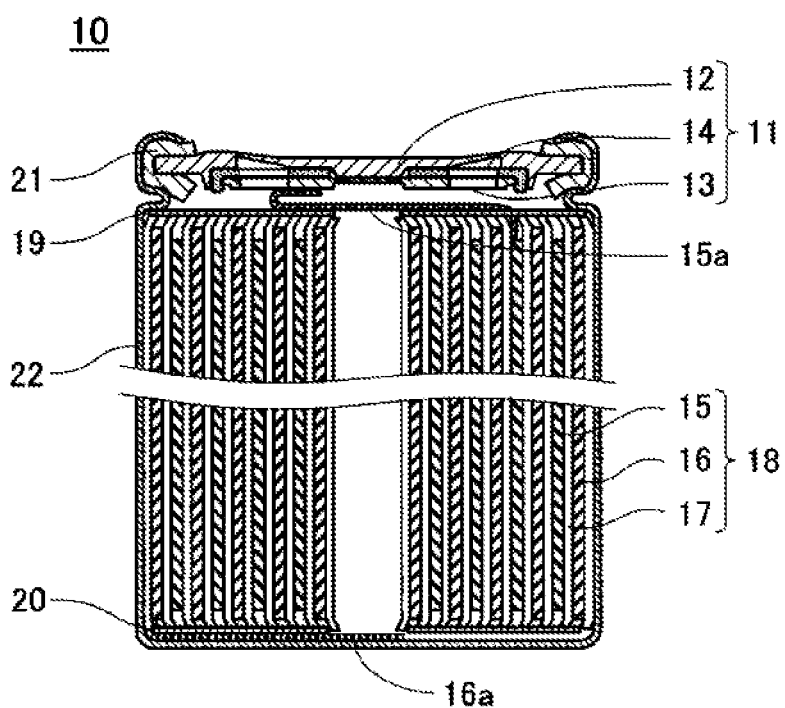
FIG. 1 is a sectional view of a non-aqueous electrolyte secondary battery according to an embodiment.

FIG. 1 is a sectional view of a non-aqueous electrolyte secondary battery 10. An electrode body 18 is accommodated in a tubular exterior can 22 having a bottom. The electrode body 18 is manufactured in a manner in which a positive-electrode plate 15 and a negative-electrode plate 16 are wound with a separator 17 interposed therebetween. A positive-electrode lead 15a and a negative-electrode lead 16a are connected to the positive-electrode plate 15 and the negative-electrode plate 16, respectively. The positive-electrode lead 15a is connected to a sealing body 11. The negative-electrode lead 16a is connected to the bottom of the exterior can 22. The sealing body 11 is crimped on an opening portion of the exterior can 22 with a gasket 21 interposed therebetween. The exterior can 22 accommodates the electrode body 18 and a non-aqueous electrolyte solution not illustrated.

Figure 2:
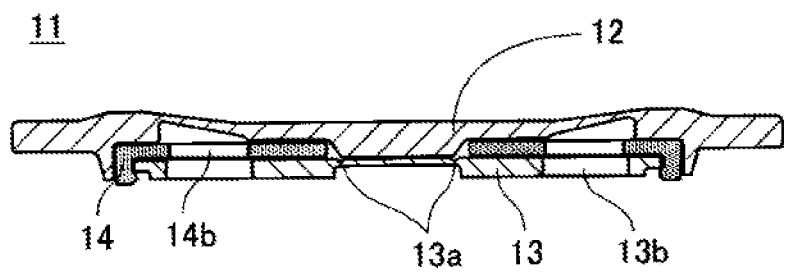
FIG. 2 is a sectional view of a sealing body according to the embodiment.

As illustrated in FIG. 2, the sealing body 11 includes a valve member 12, a metal plate 13, and an insulating plate 14 that is interposed therebetween. A central portion of the valve member 12 projects toward the metal plate 13, and the projecting portion is joined to the metal plate 13. The positive-electrode lead 15a is connected to the metal plate 13. The metal plate 13 functions as an internal terminal plate. The metal plate 13 is not necessarily connected directly to the positive-electrode lead 15a. Another conductive member that serves as the internal terminal plate can be interposed between the metal plate 13 and the positive-electrode lead 15a. A part of the valve member 12 is exposed to the outside of the battery, and the exposed part can be connected to, for example, external equipment. That is, according to the present embodiment, the valve member 12 functions as a positive-electrode external terminal.

The sealing body 11 includes a current interrupt mechanism that is formed of the valve member 12, the metal plate 13, and the insulating plate 14. The current interrupt mechanism operates as follows. When gas is produced in the battery, and the pressure in the battery increases, the pressure is applied to the valve member 12. When the pressure in the battery reaches a certain value, a thin portion 13a that the metal plate 13 includes breaks, and a current path between the valve member 12 and the metal plate 13 is interrupted. When the pressure in the battery further increases, the valve member 12 breaks, and the gas in the battery is discharged.

The sealing body 11 according to the present embodiment consists of the bare minimum of elements to form the current interrupt mechanism. Accordingly, the thickness of the sealing body decreases, and the capacity of the non-aqueous electrolyte secondary battery can be increased. The sealing body 11 can include an additional element such as a terminal cap or a PTC (Positive Temperature Coefficient) element in accordance with the application of the non-aqueous electrolyte secondary battery. For example, the terminal cap can be disposed on the valve member to increase the mechanical strength of the sealing body. However, as in the present embodiment, the valve member is preferably exposed to the outside of the battery to sufficiently ensure a gas discharge path when the valve member breaks.

The materials of the valve member 12 and the metal plate 13 are preferably metallic materials that are highly flexible and can be stable even when a positive electrode potential is applied thereto in the non-aqueous electrolyte solution. Examples of the metallic materials include aluminum and an aluminum alloy. The valve member 12 and the metal plate 13 can be joined to each other by being irradiated with high energy rays such as laser rays.

Figure 3:
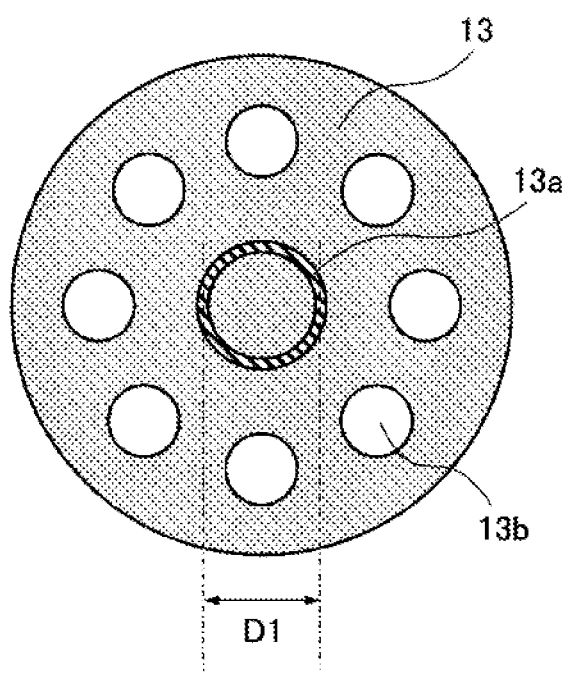
FIG. 3 is a plan view of a metal plate according to the embodiment.

As illustrated in FIG. 3, the metal plate 13 includes the thin portion 13a that is circular and that serves as an easily broken member. The thin portion 13a is formed in a central portion of the metal plate 13. The thin portion 13a is concentric with an outermost circumferential portion of the metal plate. The thin portion 13a may have a C-shape on a circle that is concentric with the outermost circumferential portion of the metal plate 13. A section of the thin portion has a V-shape but is not limited thereto. The section can have, for example, a U-shape. Eight air vents 13b are formed outside the thin portion 13a. The joint between the valve member 12 and the metal plate 13 is formed inside the thin portion 13a.

The diameter D1 of the thin portion 13a is determined on the basis of the thinnest portion in a section of the thin portion 13a that is perpendicular to the circumferential direction. When the thinnest portion in the section of the thin portion is flat, the the diameter D1 of the thin portion is determined on the basis of an inner-circumferential-side end portion of the thin portion. When the thin portion has a C-shape, the thin portion is preferably formed on the same circle, and the diameter of the circle is determined to be D1 of the thin portion.

Figure 4:
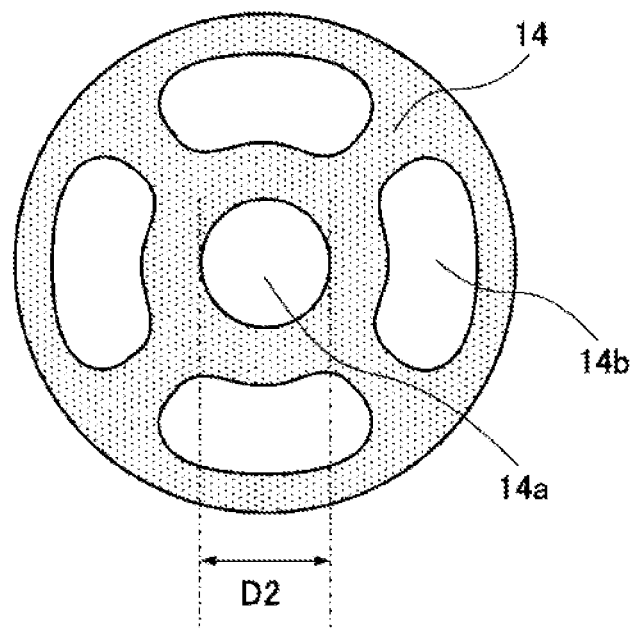
FIG. 4 is a plan view of an insulating plate according to the embodiment.
Figure 5:
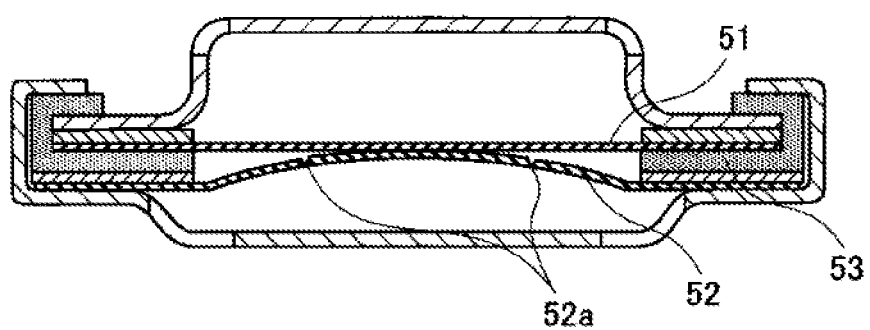
FIG. 5 is a sectional view of a sealing body disclosed in PTL 1.

As illustrated in FIG. 4, the insulating plate 14 has a hollow portion 14a in a central portion. The thin portion 13a and the hollow portion 14a are concentric with each other when viewed from a direction perpendicular to the metal plate 13. The direction perpendicular to the metal plate 13 coincides with the direction in which the valve member 12, the metal plate 13, and the insulating plate 14 are stacked. Four air vents 14b are formed around the hollow portion 14a. The air vents 14b are not necessarily essential because of the presence of the hollow portion 14a. However, in the case where the hollow portion 14a poorly functions as a path through which the gas that is produced in the battery flows, the air vents 14b are preferably formed. The material that can be used for the insulating plate 14 is preferably a polymeric resin material, examples of which include a polypropylene (PP) resin and a polybutylene terephthalate (PBT) resin.

A ratio (D1/D2) of the diameter D1 of the thin portion 13a to the the diameter D2 of the hollow portion 14a is preferably no less than 0.56 and no more than 1. When D1/D2 is within the above range, the variation in the operating pressure of the current interrupt mechanism is reduced as demonstrated by experimental results described later.

EXAMPLE

The non-aqueous electrolyte secondary battery 10 according to the present embodiment will now be described in more detail with reference to examples.

(Manufacture of Sealing Body A1)

The valve member 12 and the metal plate 13 serving as the internal terminal plate were manufactured by pressing an aluminum plate. The circular thin portion 13a was formed in the central portion of the metal plate 13. A section of the thin portion 13a had a V-shape. The diameter D1 of the thin portion 13a was 2.8 mm. The insulating plate 14 was manufactured by injection-molding a polypropylene resin. The diameter D2 of the hollow portion 14a of the insulating plate 14 was 2.8 mm. The valve member 12 and the metal plate 13 were joined to each other by laser welding. The sealing body A1 was manufactured in this way.

(Manufacture of Sealing Bodies A2 to A6)

Sealing bodies A2 to A6 were manufactured in the same manner as the sealing body A1 except that the diameter D2 of the hollow portion 14a of the insulating plate 14 was changed into values illustrated in Table 1.

(Manufacture of Positive-Electrode Plate)

A lithium nickel composite oxide expressed as $LiNi_{0.91}Co_{0.06}Al_{0.03}O_2$ was used as a positive electrode active material. The positive electrode active material in an amount of 100 parts by mass, acetylene black (AB) as a conductive material in an amount of 1 part by mass, polyvinylidene fluoride (PVdF) as a binder in an amount of 1 part by mass were mixed, and the mixture was kneaded in N-methyl-2-pyrrolidone to prepare a positive-electrode mixture slurry. The positive-electrode mixture slurry was applied to both surfaces of a positive-electrode current collector that is composed of an aluminum foil having a thickness of 13 μm and dried to form a positive-electrode mixture layer. The positive-electrode mixture layer was pressed by a roller such that a filling density became 3.6 g/cm³. An electrode plate after pressing was cut with predetermined dimensions to manufacture the positive-electrode plate 15. An exposed positive-electrode core portion was formed such that there was no positive-electrode mixture layer on a part of the positive-electrode plate 15. The positive-electrode lead 15a that was composed of aluminum was connected to the exposed positive-electrode core portion.

(Manufacture of Negative-Electrode Plate)

A mixture of graphite in an amount of 93 parts by mass and silicon oxide (SiO) in an amount of 7 parts by mass was used as a negative electrode active material. The negative electrode active material in an amount of 100 parts by mass, carboxymethyl cellulose (CMC) as a thickener in an amount of 1 part by mass, and styrene-butadiene rubber (SBR) as a binder in an amount of 1 part by mass were mixed, and the mixture was kneaded in water to prepare a negative-electrode mixture slurry. The negative-electrode mixture slurry was applied to both surfaces of a negative-electrode current collector that was composed of a copper foil having a thickness of 6 μm and dried to form a negative-electrode mixture layer. The negative-electrode mixture layer was pressed by a roller such that the filling density became 1.65 g/cm³. An electrode plate after pressing was cut with predetermined dimensions to manufacture the negative-electrode plate 16. An exposed negative-electrode core portion was formed such that there was no negative-electrode mixture layer on a part of the negative-electrode plate 16. The negative-electrode lead 16a that was composed of copper was connected to the exposed negative-electrode core portion.

(Preparation of Non-Aqueous Electrolyte Solution)

Ethylene carbonate (EC), diethyl carbonate (DMC), ethyl methyl carbonate (MEC) were mixed at a volume ratio of 20:75:5 to prepare a non-aqueous solvent. Lithium hexafluorophosphate ($LiPF_6$) as an electrolyte salt was dissolved at a concentration of 1.4 mol/L in the non-aqueous solvent to prepare a non-aqueous electrolyte solution.

(Manufacture of Electrode Body)

The positive-electrode plate 15 and the negative-electrode plate 16 were wound with the separator 17 interposed therebetween to manufacture the electrode body 18. A polyethylene fine porous film including a heat-resistant layer formed on a surface thereof was used as the separator 17, and in the heat-resistant layer, a filler of alumina ($Al_2O_3$) was dispersed in polyamide. The surface on which the heat-resistant layer was formed faced the positive-electrode plate.

(Manufacture of Non-Aqueous Electrolyte Secondary Battery)

An upper insulating plate 19 and a lower insulating plate 20 were disposed on the upper side and lower side of the electrode body 18. The electrode body 18 was inserted into the tubular exterior can 22 having the bottom. The positive-electrode lead 15a was connected to the sealing body 11. The negative-electrode lead 16a was connected to the bottom of the exterior can 22 to manufacture a battery before injection. The non-aqueous electrolyte solution was injected into the battery before injection. The sealing body 11 was crimped on the opening portion of the exterior can 22 with the gasket 21 interposed therebetween to manufacture the cylindrical non-aqueous electrolyte secondary battery 10 having an outer diameter of 18 mm and a height of 65 mm. The sealing body A1 was used as the sealing body.

(Measurement of Operating Pressure of Current Interrupt Mechanism)

Each of the sealing bodies A1 to A6 was crimped on the opening portion of the exterior can of a battery before injection manufactured as described in the example with the gasket interposed therebetween to manufacture batteries for measuring the operating pressure. No non-aqueous electrolyte solution was injected in the batteries for measuring the operating pressure. A through-hole having a diameter of 3 mm was formed in the bottom of each battery for measuring the operating pressure. A copper tube was inserted. A sealant was applied between the exterior can and the copper tube. Air was injected into the battery for measuring the operating pressure via the copper tube. The pressure in the battery was increased until the current interrupt mechanism operated, and the operating pressure of the current interrupt mechanism was measured. Such measurement was taken on 10 sealing bodies A1 to 10 sealing bodies A6. The standard deviation of the operating pressure of each of the sealing bodies A1 to A6 was calculated. Table 1 illustrates the summary of the results.

TABLE 1

| | DIAMETER D1 (mm) OF THIN PORTION | DIAMETER D2 (mm) OF HOLLOW PORTION | D1/D2 | STANDARD DEVIATION OF OPERATING PRESSURE (kgf/cm²) |
|---|---|---|---|---|
| SEALING BODY A1 | 2.8 | 2.8 | 1 | 0.4 |
| SEALING BODY A2 | 2.8 | 3 | 0.93 | 0.2 |
| SEALING BODY A3 | 2.8 | 4 | 0.70 | 0.3 |
| SEALING BODY A4 | 2.8 | 5 | 0.56 | 0.5 |
| SEALING BODY A5 | 2.8 | 7 | 0.40 | 0.7 |
| SEALING BODY A6 | 2.8 | 10 | 0.28 | 1.7 |

It can be understood from Table 1 that the larger the ratio (D1/D2) of the diameter of the thin portion of the metal plate to the diameter of the hollow portion of the insulating plate, the smaller the variation in the operating pressure. The standard deviation of the operating pressure of each of the sealing bodies A1 to A4 is 0.5 kgf/cm$^2$ or less, and the variation is very small. In particular, when D1/D2 is within the range of 0.7 to 1, the variation is greatly reduced. The reason why this effect is achieved is presumably that when the insulating plate in contact with the metal plate is adjacent to the thin portion, a portion of the metal plate other than the thin portion is inhibited from deforming when the pressure in the battery increases. From the results, D1/D2 is preferably no less than 0.56 and no more than 1, more preferably no less than 0.7 and no more than 1.

The above effects of the present invention less depend on the materials of the electrode body and the electrolyte solution that are accommodated in the exterior can. Accordingly, the effects of the present invention can be achieved also in the case where the materials of the electrode body and the electrolyte solution used in the above example are replaced with other known materials.

INDUSTRIAL APPLICABILITY

According to the present invention, a cylindrical battery that includes a current interrupt mechanism in which the variation in the operating pressure is small can be provided as described above. The present invention can be widely used for cylindrical batteries, and the industrial applicability thereof is wide.

REFERENCE SIGNS LIST

10 non-aqueous electrolyte secondary battery
11 sealing body
12 valve member
13 metal plate
13a thin portion
14 insulating plate
14a hollow portion
18 electrode body
22 exterior can

The invention claimed is:

1. A cylindrical battery comprising: an electrode body; an electrolyte solution; a tubular exterior can that has a bottom and that accommodates the electrode body and the electrolyte solution; and a sealing body that is crimped on an opening portion of the exterior can,
   wherein the sealing body includes a current interrupt mechanism in which a valve member and an internal terminal plate are joined to each other with an insulating plate that includes a circular hollow portion interposed therebetween,
   wherein the internal terminal plate is joined to a lead that extends from the electrode body,
   wherein the internal terminal plate includes a thin portion that has a circular shape or a C-shape,
   wherein the hollow portion and the thin portion are concentric with each other when viewed from a direction perpendicular to the internal terminal plate,
   wherein D1/D2 is no less than 0.56 and no more than 1 where D1 is a diameter of the thin portion, and D2 is a diameter of the hollow portion, and
   wherein the valve member is exposed to an outside of the battery.

2. The cylindrical battery according to claim 1, wherein a joint between the valve member and the internal terminal plate is formed by being irradiated with high energy rays.

3. The cylindrical battery according to claim 1, wherein the valve member includes a projection that projects toward the internal terminal plate.

4. The cylindrical battery according to claim 1, wherein one or more air vents are formed around the hollow portion, each air vent being spaced apart from the hollow portion.

* * * * *